United States Patent [19]

Dix et al.

[11] 4,052,351
[45] Oct. 4, 1977

[54] STABILIZATION OF OLEFIN POLYMERS

[75] Inventors: James S. Dix, Greenville; Ronald D. Mathis, Taylors, both of S.C.

[73] Assignee: Phillips Petroleum Company, Bartlesville, Okla.

[21] Appl. No.: 601,734

[22] Filed: Aug. 4, 1975

[51] Int. Cl.$^2$ .............................................. C08L 93/00
[52] U.S. Cl. ............................ 260/23 H; 252/400 R; 260/23 XA; 260/23 S; 260/23 R; 260/45.75 N
[58] Field of Search .................. 260/23 XA, 45.75 N, 260/94.9 GD, 252, 182, 23 H

[56] References Cited

U.S. PATENT DOCUMENTS

| 3,310,510 | 3/1967 | Breslow et al. ............... 260/45.75 N |
|---|---|---|
| 3,410,799 | 11/1968 | Noshay et al. ..................... 260/45.75 |
| 3,424,716 | 1/1969 | Noshay ............................. 260/45.75 |
| 3,464,943 | 9/1969 | Newland et al. ................... 260/23 H |
| 3,637,582 | 1/1972 | Gilles ............................. 260/45.8 N |
| 3,640,928 | 2/1972 | Murayama ...................... 260/23 XA |
| 3,705,126 | 12/1972 | Matsai ................................ 260/23 H |
| 3,821,142 | 6/1974 | Dix .................................... 260/23 H |
| 3,840,494 | 10/1974 | Murayama et al. ............ 260/45.8 N |

OTHER PUBLICATIONS

Felder et al.: Augewandte Makromolekulare Chemie 31 (433), 35–54 (1973).

*Primary Examiner*—Melvyn I. Marquis

[57] ABSTRACT

Homopolymers and copolymers of 1-olefins are protected against the deleterious effects of ultraviolet light by incorporating therein an additive system consisting of a nickel carboxylate and a piperidine derivative in an amount sufficient to prevent such deterioration.

17 Claims, No Drawings

STABILIZATION OF OLEFIN POLYMERS

This invention relates to polyolefin stabilization.

The importance of protecting 1-olefin polymers againgst the degradative effect of sunlight is well known. Numerous additives have been found to be effective, to varying degrees, for certain polymer compositions to provide this protection.

It is an object of this invention to provide an ultraviolet light stabilizing system for polyolefins.

It is another object to provide polyolefins stabilized against the degradative effect of ultraviolet light.

Other objects and advantages of the present invention will be apparent from a reading of the specification and appended claims.

In accordance with the present invention there is provided a polyolefin composition stabilized against the effects of ultraviolet light degradation comprising a normally solid polymer of an aliphatic 1-olefin having from 2 to 8 carbon atoms per molecule having incorporated therein a stabilizing amount of a stabilizer system consisting of:

A. a nickel salt of a saturated fatty acid having from 8 to 20 carbon atoms per molecule, and B. a piperidine derivative selected from the group consisting of 1. compounds of the formula

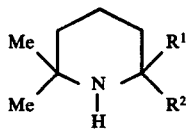

wherein Me is methyl, and $R^1$ and $R^2$ are individually selected from the group consisting of hydrogen and an alkyl member of 1 to 4 carbon atoms;

2. compounds of the formula

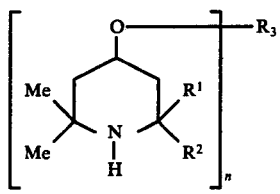

wherein Me, $R^1$ and $R^2$ are as described above, and n in an integer having a value of 1 or 2, wherein when n is 1, $R_3$ is selected from the group consisting of hydrogen and an acyl member derived from a saturated, unsubstituted aliphatic monocarboxylic acid having from 6 to 20 carbon atoms or an unsubstituted or alkyl-substituted aromatic monocarboxylic acid having from 7 to 20 carbon atoms, when n is 2, $R_3$ is a diacyl member derived from a saturated, unsubstituted aliphatic dicarboxylic acid having from 6 20 carbon atoms or an unsubstituted or alkyl-substituted aromatic dicarboxylic acid having from 8 to 20 carbon atoms; and 3. compounds of the formula

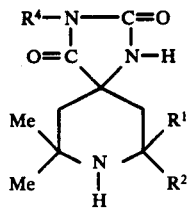

wherein Me, $R^1$ and $R^2$ are as defined above and $R^4$ is a member selected from the group consisting of hydrogen and alkyl having from 1 to 12 carbon atoms.

The term "polyolefin" as used herein is intended to include homopolymers and copolymers of aliphatic 1-olefins having from 2 to 8 carbon atoms per molecule. The term includes homopolymers such as polyethylene, polypropylene and poly-1-butylene, and copolymers of ethylene/propylene, ethylene/1-butene, ethylene/1-hexene, ethylene/1-octene and the like. Presently preferred polymers include polypropylene and propylene/1-olefin copolymers containing at least about 90 mole percent propylene and from about 0.1 up to about 10 mole percent of a 1-olefin comonomer. Also suitable for stabilization in accordance with the present invention are blends of polyolefins with other polymers such as the polystyrenes, polyvinyl chloride, polyvinyl acetates, polyamides and the like and mixtures thereof.

Examples of the piperidine derivatives of Formula (B) (1), above, employed in this invention include:
2,2-dimethylpiperidine,
2,2,6-trimethylpiperidine,
2,2,6,6-tetramethylpiperidine,
2,2-dimethyl-6,6-diethylpiperdine,
2,2,6-trimethyl-6-ethylpiperidine,
2,2-dimethyl-6,6-dipropylpiperidine,
2,2-dimethyl-6,6-di-n-butyliperidine, and the like.

Examples of the piperidine derivatives of Formula (B) (2), above, employed in the present invention include:
4-hydroxy-2,2-dimethyl-6,6di-n-propylpiperidine
4-acetoxy-2,2-dimethyl-6-ethylpiperidine,
2,2,6,6-tetramethyl-4-octanoyloxypiperidine,
4-lauroyloxy-2,2-dimethyl-6,6-di-n-butylpiperidine,
2,2,6,6-tetramethyl-4-stearoyloxypiperidine,
4-benzoyloxy-2,2,6,6-tetramethylpiperidine,
2,2,6,6-tetramethyl-4-p-toluoyloxypiperidine,
2,2,6,6-tetramethyl-4-($\beta$-maphthoyloxy)piperidine,
Bis(2,2,6,6-tetramethyl-4-piperidyl)adipate,
Bis(2,2,6,6-tetramethyl-4-piperidyl)terephthalate,
4-salicyloyloxy-2,2,6,6-tetramethylpiperidine,
4-(2-hydroxy-4-octyloxybenzoyloxy)-2,2-di-methylpiperidine,
4-(3,5-di-t-butyl-2-hydroxybenzoyloxy)-2,2,6,6-tetramethylpiperidine,
4-(3,5-di-t-butyl-4-hydroxybenzoyloxy)-2,2,6,6-tetramethylpiperidine,
Bis(2,2,6,6-tetramethyl-4-piperidyl)sebacate, and the like.

In a presently preferred embodiment the piperidine derivative of Formula (B) (2) is bis(2,2,6,6-tetramethyl-4-piperidyl)sebacate.

Examples of piperidine derivatives of Formula (B) (3), above, employed in the present invention include:
1,3,8-triaza-2,4-dioxo-3-octyl-7,7,9,9-tetramethyl-spiro[4.5]decane,
1,3,8-triaza-2,4-dioxo-3n-butyl-7,7-dimethyl-9,9-(di-n-butyl)- spiro[4,5]decane, 1,3,8-triaza-2,4-dioxo-7,7-dimethyl-9-ethyl-spiro[4.5]-decane, 1,3,8-triaza-2,4-dioxo-3-dodecyl-7,7-dimethyl-spiro[4.5]decane, and the like.

In a presently preferred embodiment the piperidine derivative of Formula (B) (3) is 1,3,8-triaza-2,4-dioxo-3octyl-7,7,9,9-tetramethyl- spiro[4.5]decane.

Examples of nickel salts of saturated fatty acids having from 8 to 20 carbon atoms per molecule include nickel octanoate, nickel decanoate, nickel dodecanoate, nickel tetradecanoate, nickel stearate and nickel eicosanoate.

In a presently preferred embodiment the nickel salt is nickel stearate.

In a presently preferred embodiment the stabilized compositions of the present invention have incorporated therein a conventional heat stabilizer. The heat stabilizers which are incorporated in the polyolefin are those conventional heat stabilizers known in the art such as the stearically-hindered phenols, sulfides and amines. In a presently preferred embodiment the heat stabilizer is a hindered phenol. Suitable hindered phenol/heat stabilizers include: 2,6di-t-butyl-4-methylphenol, octadecyl[3-(3,5-di-t-butyl- 4-hydroxyphenyl)]-propionate, di-n-octadecyl(3,5-di-t-butyl-4-hydroxybenzyl) phosphonate, tetrakis[methylene(3,5-di-t-butyl-4-hydroxyhydrocinnamate)]methane, 1,3,5-trimethyl-2,4,6-tris(3,5-di-t-butyl-4-hydroxybenzyl) benzene and tris(3,5-di-t-butyl-4-hydroxybenzyl) isocyanurate.

The amount of the UV stabilizing system to be employed in the polyolefin in accordance with the present invention can be widely varied, depending upon the properties and particular application of the stabilized polyolefin and other factors. Generally, the nickel salt is employed in an amount ranging from 0.05 to about 5 php (parts per 100 parts of polymer) and the piperidine derivative is employed in an amount ranging from 0.05 to about 5 php. It is presently preferred that each component be employed in an amount ranging from about 0.1 to about 1.25 php.

The amount of heat stabilizer to be added to the polymeric compositions can vary from about 0.02 to about 1 php, preferably from about 0.05 to about 0.5 php.

The weight ratio of the nickel salt to the piperidine derivative can vary from about 10:1 to about 1:10, preferably from about 3:1 to about 1:3. The weight ratio of the combination of the nickel salt and the piperidine derivative to the heat stabilizer can vary from about 100:1 to about 2:1, preferably from about 25:1 to about 4:1.

Other stabilizers, pigments, processing aids, antistatic agents and the like can be added to the composition as desired or required.

The stabilizing systems of the present invention can be incorporated into the polymer in any conventional manner such as by dry blending the additive system directly with polymer pellets or fluffy by means of tumble mixers, Henschel blenders and the like. Solutions or slurries of the stabilizers can be sprayed onto or admixed with a granular polymer. The stabilizers can also be blended with a molten polymer by means of a Banbury mixer, Brabender mixer, roll mill, screw extruder and the like.

The following examples illustrate the invention.

EXAMPLE I

A sample of commercial polypropylene having a nominal melt flow of 3 as determined according to the procedure of ASTM D 1238-62T, Condition L, was divided into aliquot portions. The polymer and, when used, the additives to be incorporated with the polymer was dry blended and the blend was masticated in a Brabender Plastograph at 200° C for 5 minutes under a nitrogen atmosphere. Each resulting product was compression molded into films 5 mils thick. Specimens were cut from each film and exposed to the radiation emitted from a twin-enclosed carbon arc Fade-Ometer modified by the incorporation of 8 fluorescent sun lamps and discontinuance of the spray cycle.

Triplicate film samples were tested for failure every 20 hours by subjecting each film strip to a rolling motion such that the entire length of the film strip was bent approximately 180°. Failure is indicated when a strip breaks.

The result of tests on compositions containing bis(2,2,6,6-tetramethyl -4-piperidyl) sebacate (identified as sebacate in the following table), nickel stearate and tris(3,5-di-t-butyl-4-hydroxybenzyl) isocyanurate (identified as isocyanurate) are given in Table I below. The amounts of each component are expressed in terms of php (parts by weight per 100 parts by weight of polymer):

Table I

| Run | Sebacate, php | Nickel Stearate, php | Isocyanurate, php | Hours to Failure Actual | Hours to Failure Expected |
|---|---|---|---|---|---|
| 1 | 0 | 0 | 0.05 | 73 | — |
| 2 | 0.15 | 0 | .05 | 327 | — |
| 3 | 0.25 | 0 | .05 | 493 | — |
| 4 | 0.35 | 0 | .05 | 513 | — |
| 5 | 0.50 | 0 | .05 | 460[a] | — |
| 6 | 0 | 0.15 | .05 | 73 | — |
| 7 | 0 | 0.25 | .05 | 60 | — |
| 8 | 0 | 0.35 | .05 | 60 | — |
| 9 | 0 | 0.50 | .05 | 73 | — |
| 10 | 0.15 | 0.35 | .05 | 420 | 314 |
| 11 | 0.25 | 0.25 | .05 | 573 | 480 |
| 12 | 0.35 | 0.15 | .05 | 647 | 513 |

[a]Spurious result

Examination of runs 1 and 6–9 indicate that nickel stearate contributes nothing to the ultraviolet light stability of the polypropylene. It is evident, however, from examination of runs 10–12 that nickel stearate enhances the UV stabilizing effect of the sebacate.

Similar enhanced activity was obtained when octadecyl[3-(3,5-di-t- butyl-4-hydroxyphenyl)]propionate was used as the heat stabilizer, as shown in Table II below:

Table II

| Run | Sebacate, php | Nickel Stearate, php | Propionate, php | Hours to Failure Actual | Hours to Failure Expected |
|---|---|---|---|---|---|
| 13 | 0 | 0 | 0.1 | 40 | — |
| 14 | 0.15 | 0 | .1 | 340 | — |
| 15 | 0.25 | 0 | .1 | 500 | — |
| 16 | 0.35 | 0 | .1 | 513 | — |
| 17 | 0.50 | 0 | .1 | 693 | — |
| 18 | 0 | 0.15 | .1 | 73 | — |
| 19 | 0 | 0.25 | .1 | 53 | — |
| 20 | 0 | 0.35 | .1 | 160[a] | — |
| 21 | 0 | 0.50 | .1 | 80 | — |
| 22 | 0.15 | 0.35 | .1 | 473 | 460[b] |
| 23 | 0.25 | 0.25 | .1 | 707 | 513 |
| 24 | 0.35 | 0.15 | .1 | 633 | 546 |

[a]Spurious result.
[b]Anomalous due to the spurious result of run 20.

Examination of runs 13 and 18–21 indicate that nickel stearate makes a minor contribution to UV light stability when the above-described propionate is employed as the heat stabilizer. It was unexpected, therefore, that nickel stearate would so enhance the UV stabilizing effect of the sebacate, as shown in runs 22–24.

The result of run 22 appears out of line due to the spurious result obtained in control run 20. Based on related control runs 18, 19 and 21, it appears that the value for run 20 should have been no greater than about 80 hours. Such a result would give a more realistic expected value of 380 hours, which is appreciably lower than the 473 hours to failure actually observed.

Similar enhanced activity was obtained for a stabilizer combination of nickel stearate and 1,3,8-triaza-2,4-dioxo-3-octyl-7,7,9,9-tetramethyl- spiro[4.5]decane as shown in Table III below. The heat stabilizer was tris(3,5-di-t-butyl-4-hydroxybenzyl) isocyanurate.

Table III

| Run | Spirodecane, php | Nickel Stearate,php | Isocyanurate, php | Hours to Failure Actual | Expected |
|---|---|---|---|---|---|
| 1 | 0 | 0 | 0.05 | 73 | — |
| 7 | 0 | 0.25 | .05 | 60 | — |
| 25 | 0.25 | 0 | .05 | 293 | |
| 26 | 0.25 | 0.25 | .05 | 520 | 280 |

Runs 25 and 26 illustrate the enhancing effect of nickel stearate when used in combination with 1,3,8-triaza-2,4-dioxo-3-octyl-7,7,9,9-tetramethyl- spiro[4.5]-decane.

EXAMPLE II

Polypropylene powder having a nominal melt flow of 12 was dry blended with 0.25 php of bis(2,2,6,6-tetramethyl-4-piperidyl) sebacate, 0.1 php of tris(3,5-di-t-butyl-4-hydroxybenzyl) isocyanurate and 0.05 php of calcium stearate, then divided into two portions. One portion was mixed with sufficient organic-based yellow pigment to give a composition containing 1 weight percent yellow pigment. Part of this mixture was blended with 1.0 php of nickel stearate, the remainder being the control. The second portion was mixed with sufficient organic-based red pigment to give a composition containing 1 weight percent red pigment. Part of this mixture was blended with 1.0 php of nickel stearate, the remainder being the conrol.

Each of the above compositions was converted into multifilaments by melt spinning. The filaments were drawn 4.75:1 and crimped. Samples of the resulting tow were exposed in a modified Fade-Ometer as in Example I to determine the time required to degrade the samples sufficiently to obtain a value of 1 gpd (gram per denier). The results are given in Table IV:

Table IV

| Run | Pigment | Nickel Stearate php | Yarn Count[a] | Original Tenacity, gpd | Hours to 1 gpd |
|---|---|---|---|---|---|
| 27 | Yellow[b] | 0 | 4588/224 | 3.43 | 230 |
| 28 | Yellow[b] | 1.0 | 4498/224 | 3.29 | 280 |
| 29 | Red[c] | 0 | 4219/224 | 3.62 | 245 |
| 30 | Red[c] | 1.0 | 3532/224 | 3.94 | 315 |

[a]Total yarn denier/total filaments.
[b]Added as 4% PMS-89053 (25% Yellow 3G concentrate), Plastic Molders Supply, Inc., Ft. Worth, Texas.
[c]Added as 4% Imperial D1333 (25% Fast Red BR FPP concentrate), Hercules, Inc., Wilmington, Delaware.

The above results illustrate the inproved ressitance to degradation resulting from exposure to UV radiation obtained when nickel stearate is included in each pigmented composition.

EXAMPLE III

Polypropylene powder having a nominal melt flow of 12 was dry blended with 0.25 php of bis(2,2,6,6-tetramethyl-4-piperidyl) sebacate, 0.1 php of octadecyl[3-(3,5-di-t-butyl-4-hydroxyphenyl)] propionate, 0.05 php of calcium stearate and sufficient of the above described yellow pigment to obtain composition containing 1 weight percent pigment. A portion of this composition was admixed with 0.5 php nickel stearate, with the remainder being the control. Each of the compositions was converted into multifilaments by melt spinning. The filaments were drawn to 4.75:1. Samples of the resulting, uncrimped tow were exposed in a modified Fade-Ometer as in Example II. The results are presented below:

Table V

| Run | Nickel Stearate,php | Yarn Count[a] | Original Tenacity, gpd | Hours to 1 gpd |
|---|---|---|---|---|
| 31 | 0 | 280/16 | 3.63 | 330 |
| 32 | 0.5 | 280/16 | 4.24 | 440 |

[a]Total yarn denier/total filaments.

The above results illustrate the improved resistance to degradation resulting from exposure to UV radiation obtained when nickel stearate is included in the composition.

EXAMPLE V

Polypropylene powder having a nominal melt flow of 12 was dry blended with 0.25 php of bis(2,2,6,6-tetramethyl-4-piperidyl) sebacate, 0.1 php of tris(3,5-di-t-butyl-4-hydroxybenzyl) isocyanurate, 0.05 php of calcium stearate and sufficient of the red pigment described above to obtain a composition containing 1 weight percent pigment. A portion of this composition was admixed with 1 php nickel stearate, with the remainder being the control. Each of the compositions was converted into multifilaments by melt spinning. The filaments were drawn to 4.75:1 and cut into 18 denier staple. Each staple sample was then blended with an equal amount of black staple similar to the red in physical properties, then needled to form batts. These batts were exposed 45° South Direct at locations in Florida and Arizona. Samples were taken every 20 hours. The time at which a discernable darkening effect on the sample was noticed is given as failure time, expressed in kilolangleys of exposure. These results are given below:

Table VI

| Run | Nickel Stearate,php | Kilolangleys to Failure Florida | Arizona |
|---|---|---|---|
| 33 | 0 | 41 | 60 |
| 34 | 1 | 60 | 74 |

The above results illustrate the improved resistance to degradation resulting from exposure to UV radiation obtained when nickel stearate is included in the composition.

Reasonable variations and modifications, which will be apparent to those skilled in the art, can be made in this invention without departing from the spirit and scope thereof.

What is claimed is:

1. A polyolefin composition stabilized against ultraviolet degradation comprising a normally solid polymer of an aliphatic 1-olefin having from 2 to 8 carbon atoms per molecule having incorporated therein a stabilizing amount of an ultraviolet light stabilizing system consisting of:
   A. a nickel salt of a saturated fatty acid having from 8 to 20 carbon atoms per molecule, and B. a piperidine derivative selected from the group consisting of
1. compounds of the formula

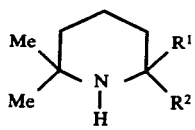

wherein Me is methyl, and R¹ and R² are individually selected from the group consisting of hydrogen and an alkyl member of 1 to 4 carbon atoms;

2. compounds of the formula

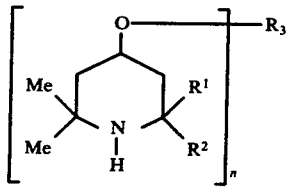

wherein Me, R¹ and R² are as described above, and n is an integer having a value of 1 or 2, wherein when n is 1, R³ is selected from the group consisting of hydrogen and an acyl member derived from a saturated, unsubstituted aliphatic monocarboxylic acid having from 6 to 20 carbon atoms or an unsubstituted or alkyl-substituted aromatic monocarboxylic acid having from 7 to 20 carbon atoms, when n is 2, R³ is a diacyl member derived from a saturated, unsubstituted aliphatic dicarboxylic acid having from 6 to 20 carbon atoms or an unsubstituted or alkyl-substituted aromatic dicarboxylic acid having from 8 to 20 carbon atoms; and 3. compounds of the formula

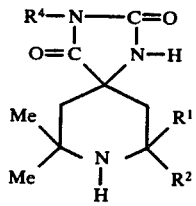

wherein Me, R¹ and R² are as defined above and R⁴ is a member selected from the group consisting of hydrogen and alkyl having from 1 to 12 carbon atoms.

2. The composition of claim 1 wherein said compound (A) is present in an amount ranging from 0.05 to about 5 php and said compound (B) is present in an approximate amount ranging from 0.05 to about 5 php.

3. The composition of claim 1 wherein said polymer is polypropylene.

4. The composition of claim 1 wherein the weight ratio of said compound (A) to said compound (B) is in the approximate range of 10:1 to 1:10.

5. The composition of claim 1 wherein said compound (A) is present in an amount of ranging from about 0.1 to about 1.25 php and said compound (B) is present in an amount ranging from about 0.1 to about 1.25 php.

6. The composition of claim 1 wherein said weight ratio of (A):(B) is in the approximate range of 3:1 to 1:3.

7. The composition of claim 1 having additionally incorporated therein (c) a hindered phenol heat stabilizer.

8. The composition of claim 7 wherein said compound (c) is present in an amount ranging from about 0.02 to about 1 php and wherein the weight ratio of (A+B) to (c) is in the approximate range of 100:1 to 2:1.

9. The composition of claim 7 wherein said compound (c) is present in an amount ranging from about 0.05 to about 0.5 php.

10. The composition of claim 7 wherein said compound (A) is nickel stearate, said compound B is bis(2,2,6,6-tetramethyl-4-piperidyl) sebacate, said compound (C) is tris(3,5-di-t-butyl-4-hydroxybenzyl) isocyanurate and said polymer is polypropylene.

11. The composition of claim 7 wherein said compound (A) is nickel stearate, said compound (B) is bis(2,2,6,6-tetramethyl-4-piperidyl) sebacate, said compound (C) is octadecyl[3-(3,5-di-t-butyl-4-hydroxyphenyl)]propionate and said polymer is polypropylene.

12. The composition of claim 7 wherein said compound (A) is nickel stearate, said compound (B) is 1,3,8-triaza-2,4-dioxo-3-octyl-7,7,9,9-tetramethyl -spiro[4.5]-decane, said compound (C) is tris(3.5-di-t-butyl-4-hydroxybenzyl) isocyanurate and said polymer is polypropylene.

13. An ultraviolet light stabilizer system for polymers consisting of a mixture of:
A. a nickel salt of a saturated fatty acid having from 8 to 20 carbon atoms per molecule, and
B. a piperidine derivative selected from the group consisting of
1. compounds of the formula

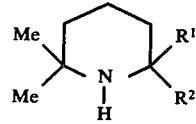

wherein Me is methyl, and R¹ and R² are individually selected from the group consisting of hydrogen and an alkyl member of 1 to 4 carbon atoms;

2. compounds of the formula

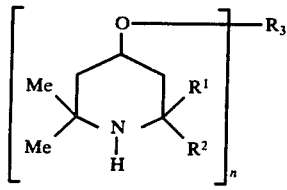

wherein Me, R¹ and R² are as described above, and n is an integer having a value of 1 or 2, wherein when n is 1, R³ is selected from the group consisting of hydrogen and an acyl member derived from a saturated, unsubstituted aliphatic monocarboxylic acid having from 6 to 20 carbon atoms or an unsubstituted or alkyl-substituted aromatic monocarboxylic acid having from 7 to 20 carbon atoms, when n is 2, $R^3$ is a diacyl member derived from a saturated, unsubstituted aliphatic dicarboxylic acid having from 6 to 20 carbon atoms or an unsubstituted or alkyl-substituted aromatic dicarboxylic acid having from 8 to 20 carbon atoms; and 3. compounds of the formula

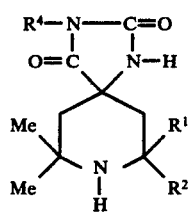

wherein Me, $R^1$ and $R^2$ are as defined above and $R^4$ is a member selected from the group consisting of hydrogen and alkyl having from 1 to 12 carbon atoms.

14. The system of claim 13 wherein the weight ratio of said compound (A) to said compound (B) is in the approximate range of 10:1 to 1:10.

15. The system of claim 13 wherein the weight ratio of said compound (A) to said compound (B) is in the approximate range of 3:1 to 1:3.

16. The system of claim 13 wherein said compound (A) is nickel stearate and said compound B is bis(2,2,6,6-tetramethyl-4-piperidyl)sebacate.

17. The system of claim 13 wherein said compound (A) is nickel stearate and said compound (B) is 1,3,8-triaza-2,4-dioxo-3-octyl-7,7,9,9- tetramethyl-spiro[4.5]-decane.

* * * * *